Dec. 31, 1940.  A. F. ERICKSON  2,227,074
AUDIBLE SIGNAL
Filed Oct. 20, 1937

Inventor:
Arthur F. Erickson
By Langurn Mrm
Atty.

Patented Dec. 31, 1940

2,227,074

UNITED STATES PATENT OFFICE 2,227,074

AUDIBLE SIGNAL

Arthur F. Erickson, Chicago, Ill.

Application October 20, 1937, Serial No. 169,935

1 Claim. (Cl. 116—34)

This invention relates to improvements in pneumatic tired vehicles and more particularly to an audible signal which remains inoperative as long as the tire is properly inflated for travel and which immediately indicates to the driver whenever the air pressure within the tire decreases below the normal during travel resulting from a slow leak or a puncture.

It is an object of this invention to produce a simple inexpensive device of this character which may be inserted between the tire and rim of the wheel, not visible if placed upon the inner side of the wheel, and which will make such a clatter whenever a tire loses air as to be audible to the driver as well as passerby when the vehicle is in motion.

With these and other objects in view reference is made to the accompanying drawing which illustrates a preferred form of this invention with the understanding that detail changes may be made without departing from the scope thereof.

This signal is designed to operate on the principle that when a strip of thin spring metal having a portion of its body slightly bowed out of the plane of the strip and given a slight set intermediate its longitudinal length is moved by pressure applied at one end it causes the body of the bowed out portion to shift to the other side of the plane emitting an audible "click" and when the pressure is removed the resiliency of the strip returns it to normal emitting an audible "clack."

Figure 1:
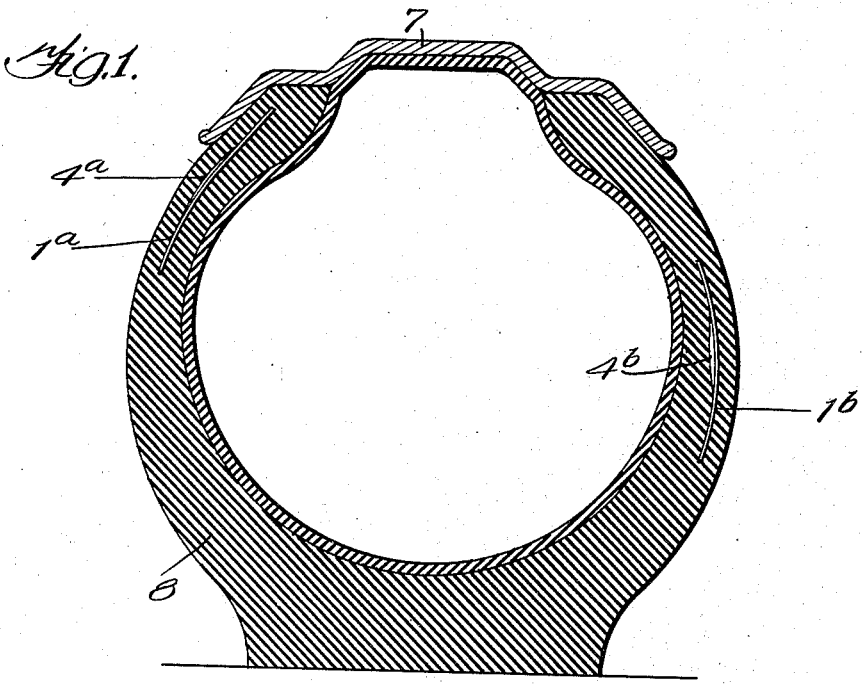
Figure 1 is a view in transverse section illustrating the application of this invention when embedded in the side wall of the tire, showing the tire inflated to normal pressure and in traction upon the road.

In the embodiment of this invention as illustrated, a metal strip, preferably of spring steel, provided with a circular bowed-out portion with the strip given an angular or curved set in the opposite direction, as shown in Figure 1, is embedded in the wall of the tire 8 between the tire supporting rim 7 and the tread of the tire. The strip is so arranged that the set imparted to it will cause the body of the strip to follow the contour of the outer surface of the tire. As shown in Figure 1, the strip 1ª is located adjacent the portion of the tire engaged by the rim 7 and the circular portion 4ª is bowed in the direction of the outer surface of the tire. Figure 1 also illustrates the strip 1ᵇ located in the side wall of the tire between the rim and tread with the circular portion 4ᵇ bowed out in the direction of the interior of the tire.

Figure 2:
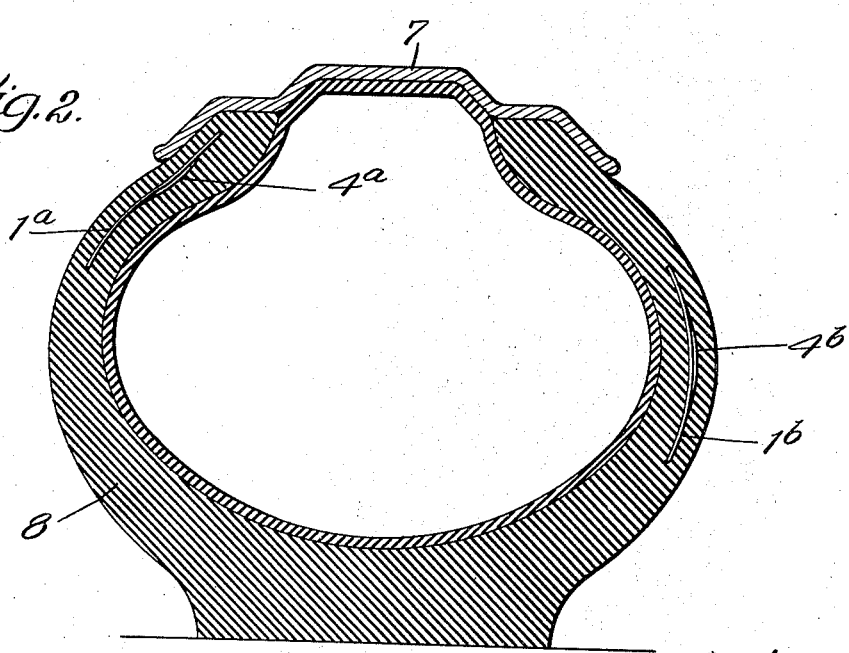
Figure 2 is a view similar to Figure 1 showing the expansion of the side walls of the tire operating the signal when the pressure within the tire has become less than normal.

When a slow leak occurs or when the tire is punctured, each time the portion of the tread of the tire in radial alignment with the strip comes in contact with the road it will be compressed by the weight of the vehicle causing the sides to expand, as shown in Figure 2, and move the end of the strip over its center causing it to emit a "click" and as soon as that point is passed the walls return to normal allowing the strip to do the same and emit a "clack" and as the wheel rotates a succession of "click-clacks" are sounded that are audible to the driver of the vehicle above the noise of the engine.

This device is readily constructed to correspond to tires of different sizes or makes and remain inoperative during the maintenance of the predetermined pressure within the tires. The employment of the signal as a part of the tire simplifies its application.

This signal is not intended to be an instrument of precision to indicate immediately a drop in pressure of one or two pounds in the tire. It is intended to indicate to the driver that the tire operating the signal is about to become flat and will operate when the pressure within the tire has leaked out sufficiently so that the weight of the vehicle, when the portion of the tread in radial alignment with the signal engages the road, will expand the side walls of the tire, and thereafter the natural resiliency of the body of the tire will return the walls to normal.

What I claim is:

An audible signal to indicate that the pressure within a pneumatic tire of the wheel of a vehicle has decreased below normal for driving comprising, a tire having resilient side walls and a tread portion therebetween normally supporting the tread in fixed relation to the rim of the wheel under normal driving pressure, and a flat strip of spring metal entirely embedded in one of the side walls, said strip having a central portion bowed-out of the plane of the strip, and having a slight set departing from that portion embedded in the side wall of the tire, said strip adapted to be moved from its set position by the weight of the vehicle expanding the side wall of the tire containing the strip and throw the bowed-out portion to the other side of the plane of the strip to emit an audible click.

ARTHUR F. ERICKSON.